US007156450B2

(12) United States Patent
McIntyre et al.

(10) Patent No.: US 7,156,450 B2
(45) Date of Patent: Jan. 2, 2007

(54) INTEGRATED TORSION BAR LIFTGATE

(75) Inventors: Andrew R. McIntyre, Port McNicoll (CA); Ronald D. McLeod, Midhurst (CA)

(73) Assignee: M & C Corporation, Sterling Heights, MI (US)

( * ) Notice: Subject to any disclaimer, the term of this patent is extended or adjusted under 35 U.S.C. 154(b) by 62 days.

(21) Appl. No.: 11/133,519

(22) Filed: May 20, 2005

(65) Prior Publication Data

US 2006/0261634 A1 Nov. 23, 2006

(51) Int. Cl.
*B60J 5/02* (2006.01)

(52) U.S. Cl. ........................ 296/146.8; 296/76; 16/308

(58) Field of Classification Search ............. 296/146.8, 296/106, 56, 146.11; 16/277, 308, 342, 298, 16/334

See application file for complete search history.

(56) References Cited

U.S. PATENT DOCUMENTS

| | | | | |
|---|---|---|---|---|
| 251,591 A | | 12/1881 | Jaeger | |
| 434,212 A | | 8/1890 | Taxis | |
| 2,395,456 A | | 2/1946 | Bunker | |
| 2,707,799 A | * | 5/1955 | Butterfield | 16/308 |
| 2,733,476 A | | 2/1956 | Eck | |
| 2,799,891 A | * | 7/1957 | Ragsdale | 16/308 |
| 2,810,153 A | | 10/1957 | Semar | |
| 2,894,277 A | * | 7/1959 | Bogater et al. | 16/298 |
| 2,895,161 A | * | 7/1959 | Badura | 16/294 |
| 2,984,517 A | | 5/1961 | Farrow et al. | |
| 2,986,770 A | * | 6/1961 | Hammond | 16/308 |
| 3,031,225 A | | 4/1962 | Saffer et al. | |
| 3,085,286 A | | 4/1963 | Whitehouse et al. | |
| 3,122,775 A | | 3/1964 | Pulleyblank | |
| 3,166,783 A | | 1/1965 | Mackie et al. | |
| 3,336,070 A | | 8/1967 | Jackson | |
| 3,339,969 A | * | 9/1967 | Bridle et al. | 296/76 |
| 3,370,317 A | | 2/1968 | Marchione | |
| 3,402,508 A | | 9/1968 | Kessler | |
| 3,643,378 A | | 2/1972 | Velavicius et al | |
| 3,649,067 A | | 3/1972 | Louton, Jr. | |
| 3,695,678 A | * | 10/1972 | Gergoe | 296/76 |
| 3,699,716 A | | 10/1972 | Wanlass | |
| 3,931,994 A | | 1/1976 | Palmiter | |
| 4,143,904 A | | 3/1979 | Cooper et al. | |
| 4,285,098 A | | 8/1981 | Hicks et al. | |
| 4,291,501 A | * | 9/1981 | Steinberg et al. | 16/308 |
| 4,378,658 A | | 4/1983 | DeLorean | |
| 4,701,977 A | | 10/1987 | Hori et al. | |
| 4,815,164 A | | 3/1989 | Rottinghaus | |
| 4,932,101 A | | 6/1990 | Lualdi | |
| 4,949,426 A | * | 8/1990 | Komaki | 16/308 |

(Continued)

*Primary Examiner*—Kiran B. Patel
(74) *Attorney, Agent, or Firm*—Brooks Kushman P.C.

(57) ABSTRACT

A method and apparatus for coupling a liftgate panel on a vehicle body for pivotal movement along a path between open and closed positions. A mounting includes hinge sets formed from two hinge leafs, at least one torsion rod extending through aligned pivot portions on each hinge set. Preferably, each hinge set is integrally formed with a common torsion pin by retainers holding ends of the torsion pin with respect to one leaf of each of the hinge sets. In a preferred embodiment, a return bent end of a common torsion pin is received in a first leaf of one of at least two hinge sets, while the other end of the rod is return bend and retained in a second leaf catch that receives an arm throughout a limited portion of the liftgate path between closed and open positions.

11 Claims, 2 Drawing Sheets

U.S. PATENT DOCUMENTS

| | | | | | |
|---|---|---|---|---|---|
| 5,039,154 | A | | 8/1991 | Lewis | |
| 5,358,301 | A | | 10/1994 | Konchan et al. | |
| 5,427,486 | A | | 6/1995 | Green | |
| D370,453 | S | | 6/1996 | Shortman et al. | |
| 5,533,234 | A | | 7/1996 | Bizek | |
| 5,641,262 | A | | 6/1997 | Dunlop et al. | |
| 5,664,289 | A | * | 9/1997 | Wolda et al. | 16/308 |
| 5,758,389 | A | * | 6/1998 | Wolda | 16/308 |
| 5,787,549 | A | | 8/1998 | Soderlund | |
| 5,791,017 | A | | 8/1998 | Kluting | |
| 5,794,309 | A | | 8/1998 | Lotz | |
| 5,839,782 | A | | 11/1998 | Kashiwamura et al. | |
| 5,960,519 | A | | 10/1999 | Thompson et al. | |
| 5,988,724 | A | | 11/1999 | Wolda | |
| 6,015,178 | A | | 1/2000 | Haack | |
| 6,018,912 | A | * | 2/2000 | Baughman et al. | 296/56 |
| 6,030,018 | A | | 2/2000 | Clare et al. | |
| 6,070,929 | A | * | 6/2000 | Barkley | 296/76 |
| 6,619,723 | B1 | | 9/2003 | Duffy | |
| 6,648,398 | B1 | | 11/2003 | Duffy | |

* cited by examiner

INTEGRATED TORSION BAR LIFTGATE

BACKGROUND OF THE INVENTION

1. Field of the Invention

The present invention relates to a method and apparatus for a vehicle liftgate and a hinge assembly associated with the liftgate that includes a torsion rod as the hinge pin journaled within the hinge leafs for selective torsion application.

2. Background Art

The construction of a movable vehicle liftgate, for example, a closure panel at the rear of the passenger compartment of a sport-utility style body type, raises challenges for vehicle manufacturers. The interior as well as the exterior surfaces must be compatible with the adjacent interior compartment and exterior compartments of the vehicle. In addition, the mounting mechanism may be concealed for aesthetic purposes, but the panel must be stable in upright and lowered positions. As a result, any attempt to make the panel displaceable, for example, a pivot axis mounting, preferably one that includes lift assist, must be compactly packaged without affecting the aesthetic appearance, access or the functionality of the panel. For example, previously known mechanisms for displacing liftgates use gas-powered struts to bias the liftgate toward a raised position. However, the axis of the struts, and the line force exerted by the struts, may not be aligned to exert substantial force at initial opening from the closed position. Accordingly, a substantial force must be exerted by a person operating the liftgate to open the liftgate.

A previously known tailgate mounting unit that permits pivoting of the tailgate between upright (closed) and horizontal (open) positions. The hinge assembly uses a torque rod and first and second hinge sets at spaced apart positions. However, while the long torque rods extends through spaced hinge sets, such constructions lack self containment of the hinge sets and require adjacent support and pivot structures because the tailgate fits between body panels. As a result, the hinge structures are not so readily incorporated with liftgates.

Another known vehicle closure hinge design that employs lift assistance in the form of coiled or clock spring type torsion devices are expensive to construct and generate such problems such as cycle noise and poor cycle life, due to binding between the numerous coils of the torsion spring structure in the panel mounting assembly. Moreover, many previously known self-contained hinges with torque rods and spring designs do not provide a sufficient length of wire in which torsion energy can be generated to displace opposite ends of the torsion rod and thus the leaf members of the hinge set, when the hinge parts are mounted to large or massive structures. Moreover, previously known vehicle panel hinges with torque rods exert a biasing force at both limits of the travel path of the panel between open and closed positions.

SUMMARY OF THE INVENTION

The present invention overcomes the above mentioned disadvantages by providing a vehicle liftgate with a mounting assembly including a hinge with a plurality of hinge sets and at least one torsion rod pivot pin in the hinge sets. Preferably, each hinge set receives a common torsion pin to maximize spring length in a limited cross car width that limits the onboard distance between the hinge sets. In addition, a powered support preferably a gas powered strut, may at least partly control displacement toward and at the liftgate open position. The torque rod is retained in the hinge sets to provide biasing force about the hinge axis selectively, so that the biasing force may be limited to a particular range of displacement within the liftgate path.

The present invention also provides a method for forming a liftgate with a common torsion pin hinge by integrating the torque rod as a pin through a plurality of hinge sets. Preferably, the torsion pin has an elongated leg that extends through aligned first and second bores in the first and second leaf parts, respectively, and by selectively bending an end of the pin to a predetermined aligned position with respect to the leaf or other adjacent structure interacting with the end to permit unbiased displacement toward the open position. Preferably, the maximum biasing force is exerted by the pin in the closed position of the liftgate so that force directed toward opening the liftgate is exerted, preferably when the strut or other actuator may be aligned in its least effective arrangement.

As a result, the present invention provides a vehicle liftgate assembly that supplements displacement biasing and simplifies construction by integrating a torsion bar hinge pin. A frame structure for the vehicle body includes a mount for a hinge leaf, and the hinge leaf contains a portion with a bore adapted to be aligned to a bore in a second pivot portion on a second leaf adapted to be mounted to the liftgate panel. A torsion rod having an elongated leg extending through the aligned first and second pivot portions, includes ends that are retained, at least within a portion of the liftgate path, with respect to one and the other of the leafs, respectively, to form an integral structure. The leafs of each hinge set are then readily mounted to the vehicle body and liftgate panel, respectively. Preferably, the ends of the torsion rod are configured to define a displacement path portion through which the rod provides biasing force about the hinge axis and another displacement path portion exhibiting an unbiased range, whereby the torsion rod may exert no force about the hinge axis through a path portion.

BRIEF DESCRIPTION OF THE DRAWINGS

The present invention will be more clearly understood by reference to the following detailed description of the preferred embodiment when read in conjunction with the accompanying drawing, in which like reference characters refer to like parts throughout the views, and in which.

DETAILED DESCRIPTION OF THE PREFERRED EMBODIMENT(S)

Figure 1:
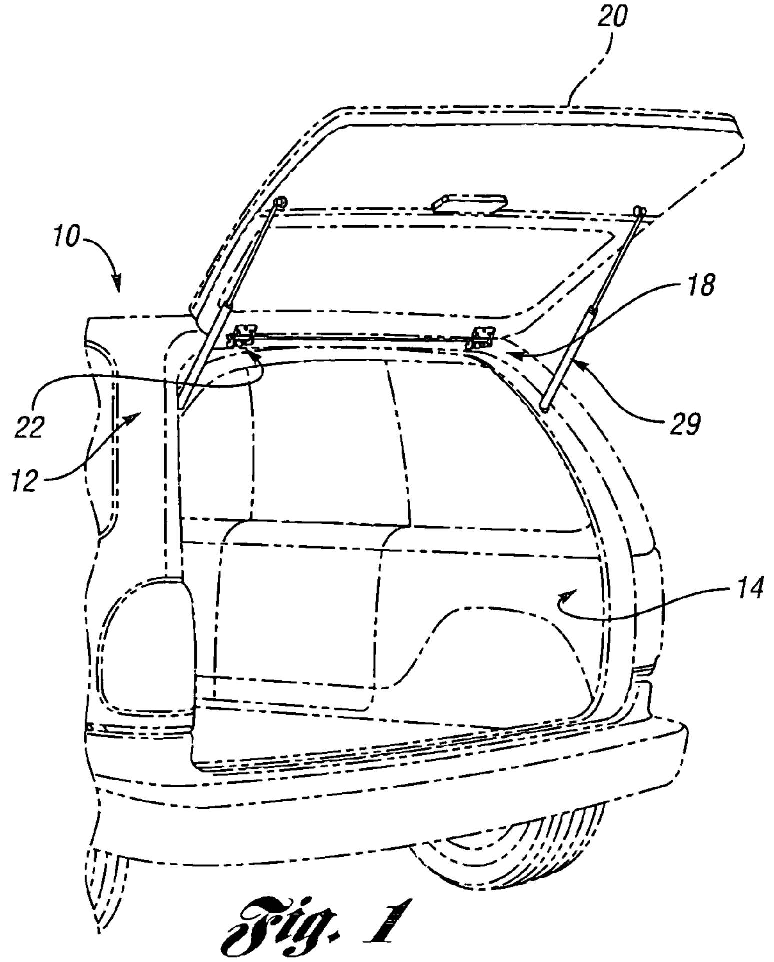
FIG. 1 is a perspective view of a motor vehicle body having a liftgate closures at the rear of the passenger compartment having a hinge constructed in accordance with the present invention.
Figure 4A:
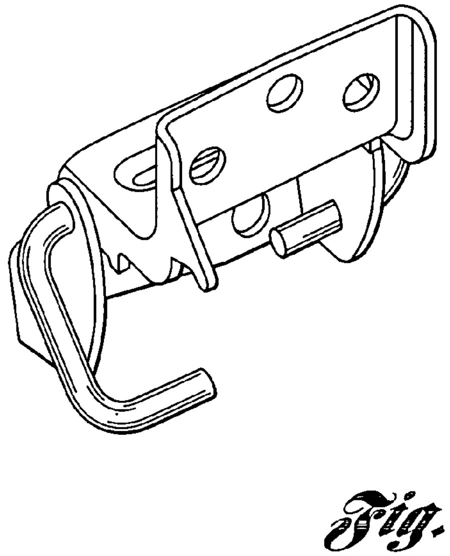
FIGS. 4*a* and 4*b* show hinge sets of a pair carrying separate torsion pins according to the present invention.
Figure 4B:
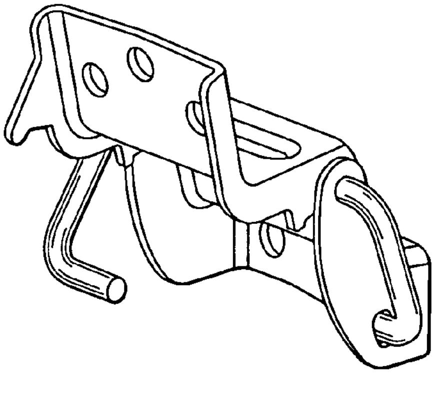

Referring first to FIG. 1, a motor vehicle 10 is shown comprising a body 12 defining an interior compartment 14. A bulkhead 18 may be made of one or more structural panels, and in the preferred embodiment, supports a liftgate 20 carried by a mounting 22 that supports the liftgate 20 for pivoting displacement from a closed position, at which it may be latched in a well known manner, to close the rear of interior compartment 14. The liftgate 20 may be raised to an open position as will be described in greater detail hereinafter with regard to FIGS. 2 and 3. Nevertheless, it should be understood that the liftgate 20 and mount 22 may be employed for other vehicle closures in a body 12 without departing from the scope and spirit of the present invention. In addition, the control of liftgate displacement may include gas-powered struts 29, that operate in a well known manner to open or raise the liftgate and/or maintain it in an open position.

Figure 2:
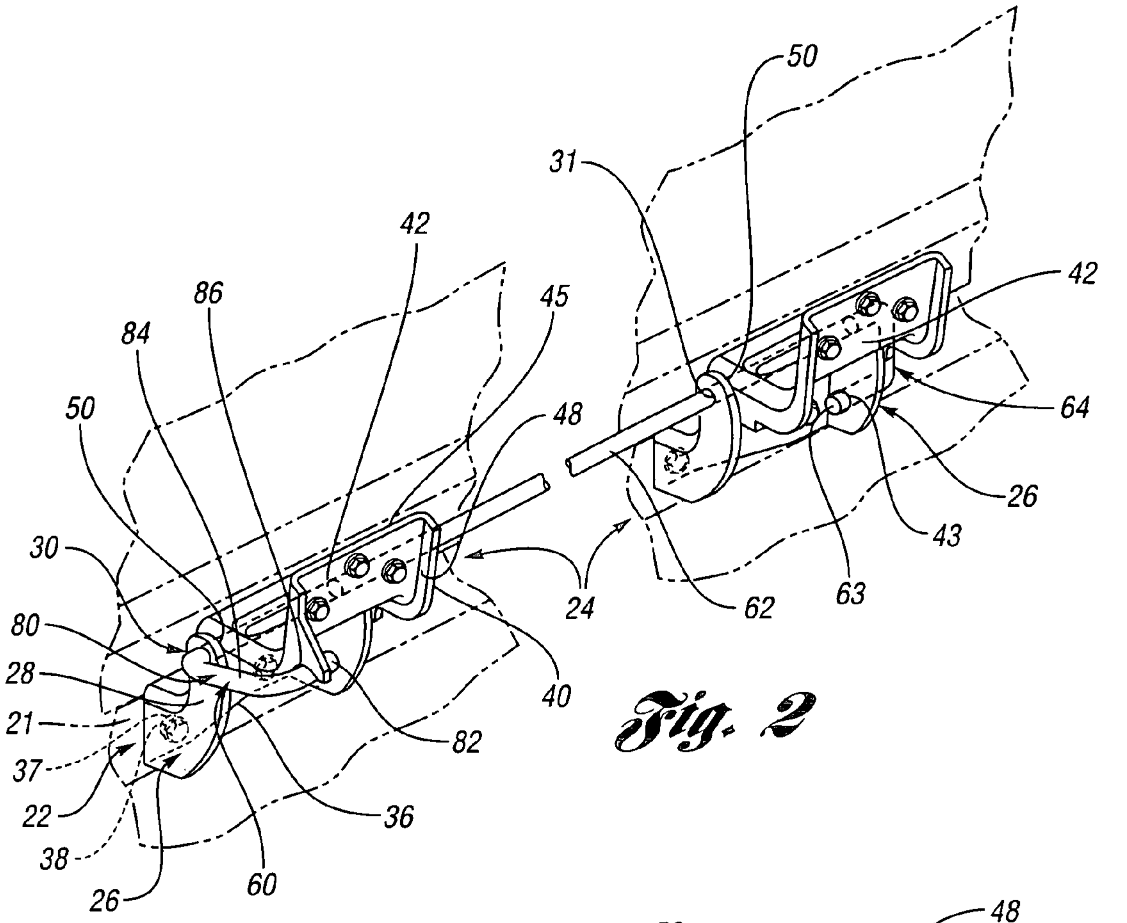
FIG. 2 is an enlarged, broken perspective view from a different direction exhibiting how the torsion bar is integrated with a hinge in an open liftgate position.
Figure 3:
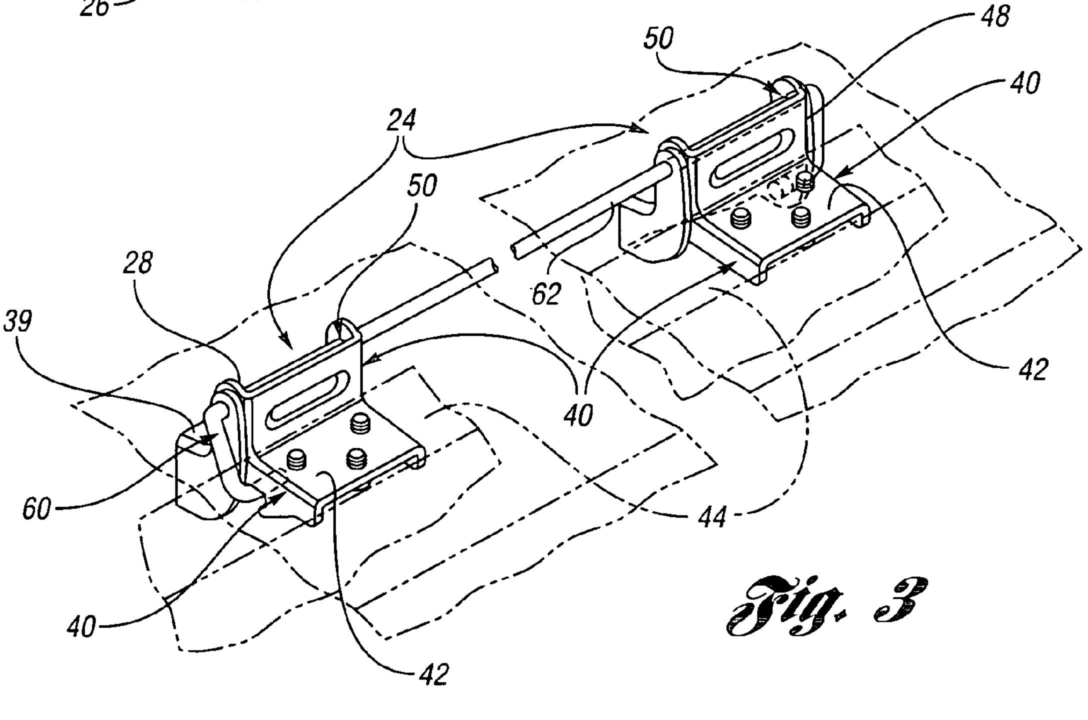
FIG. 3 is an enlarged, broken perspective view of a liftgate hinge set shown in FIGS. 1 and 2 but with the liftgate in a closed position.

In the preferred embodiment as shown in FIGS. 1–3, the mounting 22 comprises a pair of hinge sets 24. Each hinge set 24 includes a first hinge leaf 26 including a mount portion 36 dimensioned to mate with a body structure 21 of the vehicle body 12. As shown in FIGS. 2 and 3, the mount portion 36 may include multiple attachment points, for example, the apertures 38 in a flange 37. An extended support portion 28 on the first leaf 26 carries a pivot portion 30 formed by spaced flanges 39, each having a bore 31 dimensioned to receive a pivot pin as will be described in greater detail below. Preferably, the pivot portion 30 is carried at a spaced position from the mount portion 36. Preferably, the mount portion 36 includes a bent flange portion 39 formed by a stamped plate forming the first hinge leaf 26.

Similarly, a second leaf 40 includes a mount portion 42 dimensioned for mating with a portion 44 of the liftgate 20. A support portion 48, also preferably provided by a pair of flanges bent from the plate 45, carries a second pivot portion 50 also adapted to receive a pivot pin as described in greater detail below. In the preferred embodiment, the pivot portion 30 of the first leaf 26 includes a bore 31 in each flange of support 28 that is aligned with a bore 33 in each flange of support 48 in the pivot portion 50 of the second leaf 40 to receive an elongated hinge pin.

Preferably, the hinge pin is a torsion rod 60 dimensioned to be received in the aligned bores of pivot portions 30 and 50 respectively. Of course, modifications of the brackets and the hinge pin are possible, without departing from the invention. For example, hollow hinge pin sleeves or bushings that receive a torsion rod may be used. The torsion rod 60 is retained, preferably with respect to the hinge sets, to provide an integral structure for ease of assembly. In that case, the torsion rod 60 ends are retained with respect to alternate ones of the leaf parts 26 and 40 of the respective hinge sets 24.

In the preferred embodiment, the torsion rod 60 includes an elongated leg 62 inserted and received through the aligned pivot portions 30 and 50. Once the leg 62 has been extended through the aligned pivot portions 30 and 50, the first inserted end 64 of the torsion rod 60 is return bent to form a retaining arm 63, so that the end 64 may be engaged with respect to the hinge leaf 26, for example, inserted in the opening 43 in the flange of support portion 28. Preferably, the return bent portion is a simple bend, for example, an arc in a single radius, although multiple radiuses and bends may be provided without departing from the scope and spirit of the present invention.

A second end 80 is then retained with respect to the other leaf 40 of the left hand hinge set, although the left hand or right hand orientation may be mutually changed without departing from the present invention. In the preferred embodiment, the second end 80 is bent outwardly from the axis of the elongated leg 62 to form a radially extending portion 84 and a returning portion or arm 82. The end 80, for example, the arm 82 is engaged at least partially with respect to the second leaf 42. In the preferred embodiment, the arm 82 carried by the radially extending portion 84 positions the arm for encasement in a catch 86.

Preferably, each hinge set 24 may be wholly constructed before attachment to the vehicle liftgate assembly to the vehicle body 12.

Preferably, the direction at which the first end 64 extends radially outwardly from the axis of the elongated leg 62 is angled with respect to the direction at which the extending portion 84 extends from the elongated leg 62 of the rod 60. The angle between the ends 64 and 84 in a plane orthogonal to the leg 62 generates a neutral position. When the liftgate pivots toward the open position, the notch forming the catch 86 releases the arm 82. Preferably, the release is at an acute angle intermediate the closed (latched) and open positions of the liftgate 20. Of course, a conventional common latch mechanism may be employed to lock the liftgate 20 in its closed position. A greater angle of displacement preferably occurs between the neutral position of the spring and the open position of the liftgate 20. Accordingly, a spring force is generated in the torsion pin 60 to release the liftgate 20 from its closed position until the arm 82 is released from the catch 86 by further pivoting of the liftgate.

This embodiment provides a cost savings in that a straight torque rod with a return bend on each end is less expensive and less problematic to manufacture than previously known coil or clock spring arrangements. Moreover, the return bends may be wide enough to avoid the increased stress that may be provided when torsion rods' end legs are bent orthogonal to the elongated leg of the torsion rod, and which stress may need to be relieved in a separate production phase before assembly of the hinge parts. Moreover, the entire hinge and spring system is self-contained and it does not require additional installation of a resilient power source once the panel has been hingedly mounted to the support area of the vehicle body 12. Moreover, the single torque rod version avoids having separately functioning springs and pivot pins at each of the separated hinge sets and avoids multiple assembly processes associated with such parts. Moreover, this hinge arrangement produces substantially less cycle noise than other arrangements and most of the length of the rod is under torsion so that lift assist performance can be more readily adjusted by selection of the rod dimensions, and the spring resilience made powerful enough despite any narrow hinge set to hinge set distance which may be limited by the vehicle construction. Moreover, the spring bias is selectively active throughout the liftgate path, and may be limited to a portion of the path as desired by selecting the geometry of the catch 86 and the angle between the ends 64 and 84 of the rod 60.

Having thus described the present invention, any modifications will become apparent to those skilled in the art to which it pertains without departing from the scope and spirit of the present invention as defined in the appended claims.

What is claimed is:

1. A liftgate pivot mounting displacing a liftgate on a vehicle body permitting movement through a path between open and closed positions comprising:

a liftgate including a mount for at least one hinge leaf of a hinge set;

at least one hinge set at said mount, each hinge set having at least one first hinge leaf including a mount portion dimensioned to mate with said liftgate mount, a support portion, and a first pivot portion carried by said support portion at a spaced position from said mount portion; and each hinge set having at least one second hinge leaf including a mount portion dimensioned for mating with a body structure, a support portion, and a second pivot portion carried by said support portion for alignment with said first pivot portion; and at least one torsion rod having an elongated leg extending through aligned first and second pivot portions of each hinge set, said torsion rod having a first end retained against rotation with respect to one of said first and second hinge leafs in a hinge set, and a second rod end bent from an aligned longitudinal portion and retained with respect to an engagement portion of the other of said first and second hinge leafs in a hinge set, said engagement portion having a catch selectively receiving an arm of said second end through a limited portion of said path between open and closed positions.

2. The vehicle liftgate mounting as described in claim 1 wherein said at least one torsion rod comprises a common torsion road through said pivot portions of at least two hinge sets.

3. The vehicle liftgate mounting as described in claim 1 wherein said second rod end is retained by said other leaf.

4. The liftgate mounting partition as described in claim 1 wherein said first and second pivot portions include a bore that receives said elongated leg solely.

5. The liftgate mounting partition as described in claim 1 wherein said first end of said torsion rod comprises a leg formed by a bend in the rod.

6. The liftgate mounting as described in claim 5 wherein said leg is retained in an opening in said one of said first and second hinge leafs.

7. The liftgate mounting as described in claim 6 wherein said catch comprises a notch in said support channel.

8. The liftgate mount as described in claim 7 wherein said support is a radially extended flange on said other of said first and second hinge leafs in said second set.

9. A vehicle hinge for a vehicle liftgate panel pivoting through a path between open and closed positions comprising:

first and second hinge sets, each hinge set including at least one first hinge leaf including a mount portion dimensioned to mate with a panel structure, a support portion, and a first pivot portion carried by said support portion at a spaced position from said mount portion;

at least one second hinge leaf including a mount portion dimensioned for mating with a vehicle body structure, an extended support portion, and a second pivot portion carried by said extended support portion for alignment with said first pivot portion; and at least one torsion rod having an elongated leg extending through aligned first and second pivot portions of each hinge set, said torsion rod having a first end retained against rotation with respect to one of said first and second hinge leafs, and a second rod end bent from an aligned longitudinal portion to form an arm and retained with respect to an engagement portion of the other of said first and second hinge leafs, said engagement portion comprising a catch selectively receiving said arm of said second end through a limited portion of said path between open and closed positions.

10. The vehicle hinge as described in claim 9 wherein said at least one torsion rod comprises a common torsion rod through said pivot portions of at least two hinge sets.

11. The vehicle hinge as described in claim 9 wherein said second rod end is selectively engaged by said other leaf.

* * * * *

UNITED STATES PATENT AND TRADEMARK OFFICE

CERTIFICATE OF CORRECTION

PATENT NO. : 7,156,450 B2
APPLICATION NO. : 11/133519
DATED : January 2, 2007
INVENTOR(S) : Andrew R. McIntyre et al.

It is certified that error appears in the above-identified patent and that said Letters Patent is hereby corrected as shown below:

Column 5, Line 18, Claim 2:

Delete “road” and insert therefor -- rod --.

Signed and Sealed this

Thirteenth Day of March, 2007

JON W. DUDAS
*Director of the United States Patent and Trademark Office*